UNITED STATES PATENT OFFICE.

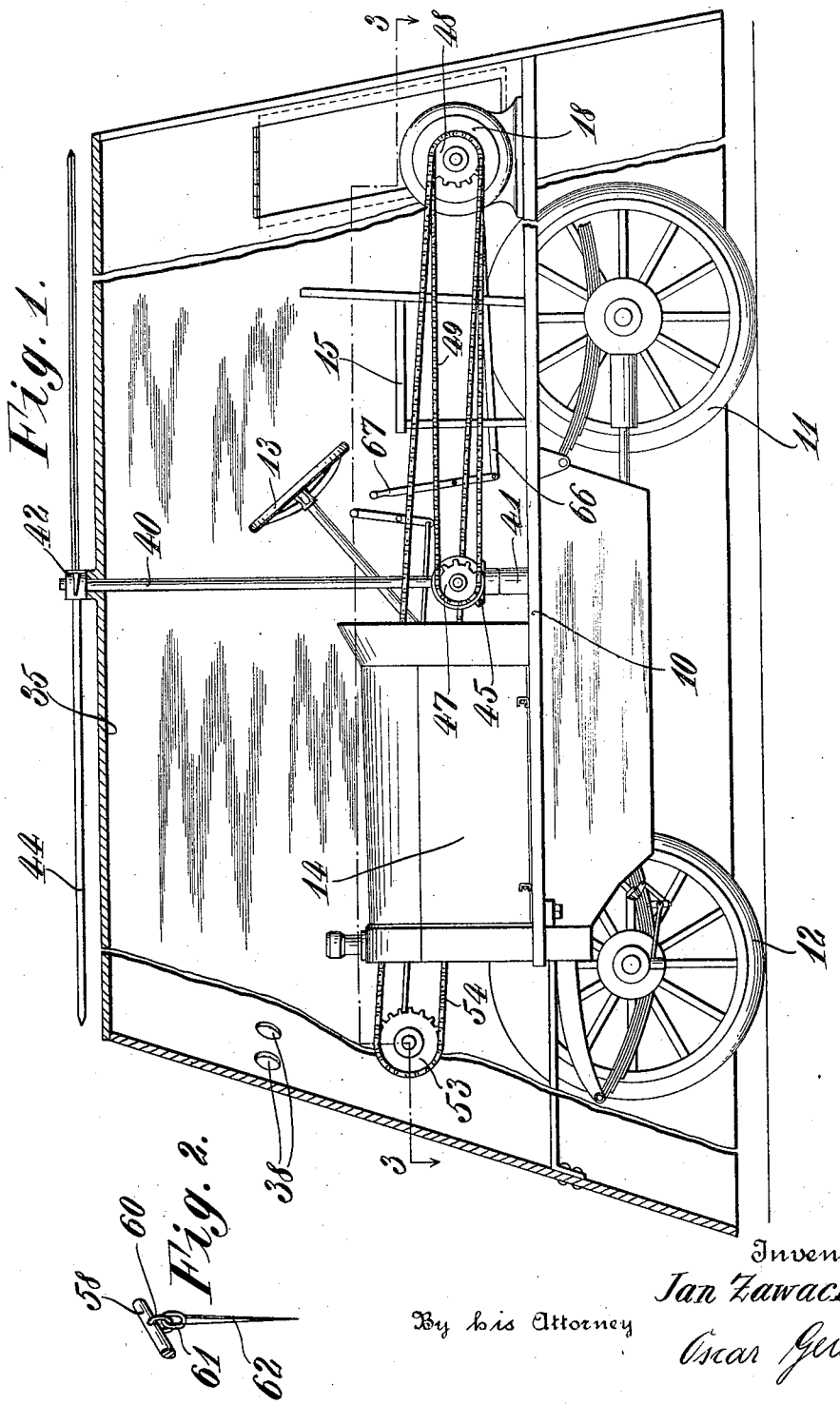

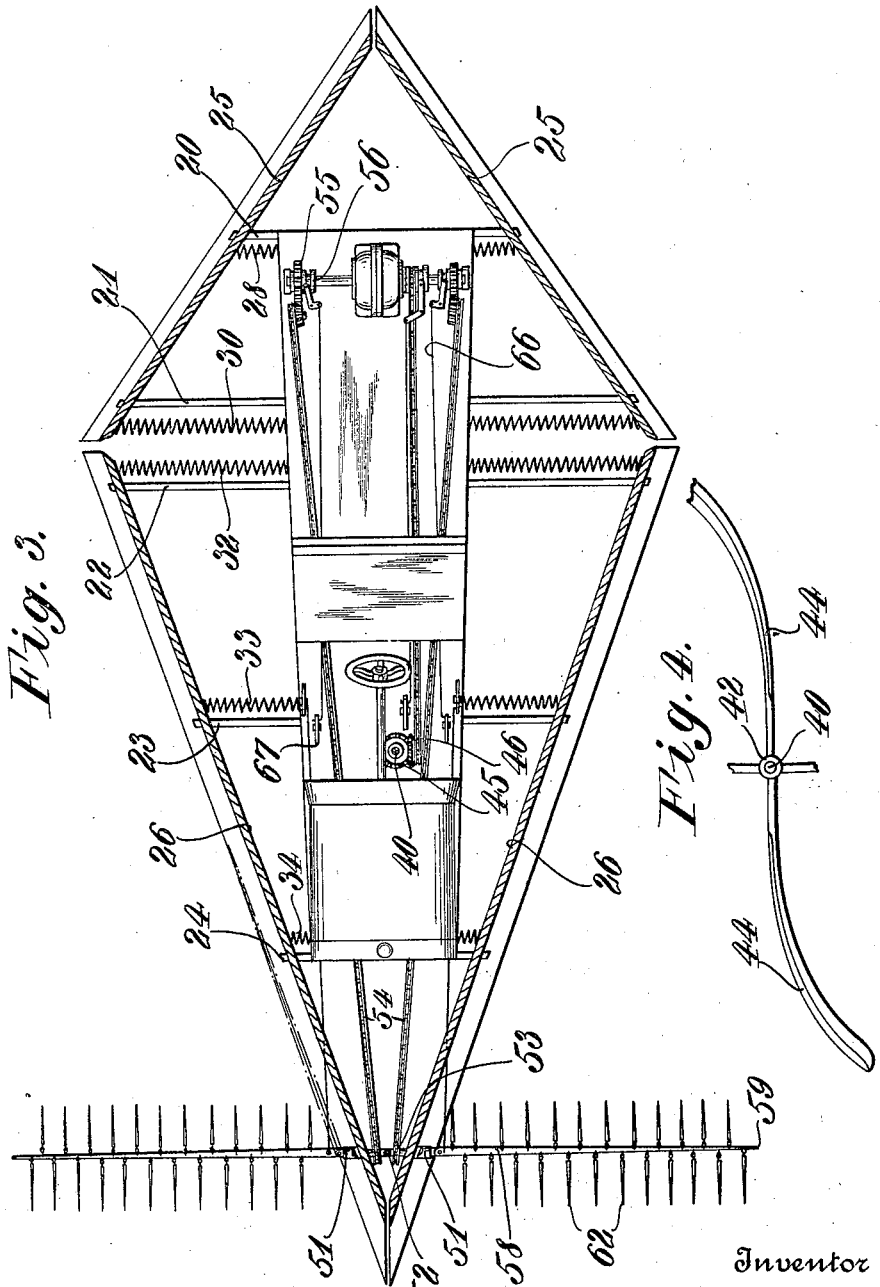

JAN ZAWACKI, OF BRIDGEPORT, CONNECTICUT.

ARMORED VEHICLE.

1,236,811.  Specification of Letters Patent.  Patented Aug. 14, 1917.

Application filed May 24, 1917. Serial No. 170,578.

*To all whom it may concern:*

Be it known that I, JAN ZAWACKI, a subject of the Czar of Russia, resident of Bridgeport, county of Fairfield, and State of Connecticut, have invented certain new and useful Improvements in Armored Vehicles, of which the following is a specification.

This invention relates to improvements in armed and armored automobiles, and has as its object the provision of a vehicle provided with armored sides by means of which the occupants are protected and which is further provided with an offensive implement of novel design.

A further object is to provide means whereby the roof of the vehicle is provided with a rotative sweeping device, whereby any article falling thereon is immediately brushed away.

These and other like objects are attained by the novel design, construction and combination of parts hereafter described and shown in the accompanying drawings, forming a material part of this disclosure, and in which:—

Figure 1 is a side elevational view of a vehicle made in accordance with the invention, parts being removed in order to show the interior construction.

Fig. 2 is a perspective fragmental view indicating the attaching means of one of the attacking or offensive weapons.

Fig. 3 is a horizontal sectional view taken on line 3—3 of Fig. 1, and

Fig. 4 is a fragmental plan view of the cover sweeping element.

The invention includes a truck 10, mounted upon rear wheels 11, the front wheels 12 being arranged as in an ordinary automobile, operated by the steering wheel 13, immediately in the rear of the engine or motor 14, a seat 15 being provided for the occupant, the chassis being similar in all respects to the ordinary type.

Mounted upon the rear of the platform or truck frame 10 is a motor 18, actuated by a current of electricity derived from the main engine or other source.

Rigidly secured on the end of the platform is a transverse bar 20, a similar but longer bar 21 being disposed toward the center of the car, other transverse bars 22, 23 and 24 passing transversely across the platform toward the front and which are used as supports for the angularly disposed metal walls arranged in pairs 25 upon opposite sides of the vehicle at the rear, similar but longer plates 26 being disposed slidably upon the bars 22, 23, and 24, forming in effect a diamond shaped structure completely enveloping the vehicle and its mechanism, the plates extending from a point near the wheel bottom to such a distance above the platform as to accommodate occupants thereon.

The rear plates 25 are held outwardly under pressure of the coiled springs 28 and 30, similar springs 32, 33 and 34 being disposed between the platform and the front walls 26 in such manner that the plates are normally extended, but which obviously relax under impact or thrust of an object applied from the exterior of the vehicle.

It is to be understood that these plates, while having their edges closely adjacent, are so arranged as to act independently one of the other, and openings 38 are provided for the admission of light and air, the same also providing means whereby the operator is enabled to look out and direct the vehicle.

A diamond shaped metallic plate cover 35 is disposed over the frame, so that articles dropped from above may not enter the vehicle to damage the occupants.

A shaft 40, mounted substantially centrally of the vehicle, rests upon the foot bearing 41, and extends upward above the cover plate 35, having a hub 42 secured at its upper projecting end and attached to the hub are a plurality of vanes or sweeper elements 44, adapted to brush away any article which rests upon the roof 35, so that should an explosive bomb or the like light thereon, it is immediately brushed to the ground.

The shaft 40 has engaged upon it a bevel gear 45, driven by a mating gear 46, attached to the hub of which is a sprocket wheel 47, a similar sprocket wheel 48 being rigidly secured upon the shaft of the motor 18 and engaged therebetween is a sprocket chain 49, whereby rotary motion is communicated to the shaft and the arms or vanes 44 caused to rapidly rotate.

A pair of arms extend outwardly from the upper front part of the vehicle, carrying at their forward end bearings 51, shafts 52 being rotatably mounted in the bearings, and driven by sprockets 53, engaged by chains 54, through trains of gears 55, the drivers of which are rigidly secured to the motor shaft in such manner that either one or both of the driving sprockets may be rotated by operating the clutches 56 through the connections 66 by manipulating the handles 67.

Hingedly attached to the shaft 52, at the end projecting through the plates 26, and upon opposite sides, are spars 58, the same gradually tapering to the extreme end 59, and connecting through the loops 60 and ring 61 are a plurality of sharply pointed spur elements 62, which obviously remain in a pendent position.

When the shaft 52 is caused to rotate at a high rate of speed, the spars 58, through centrifugal force, are held normally outward substantially in alinement and in advance of the vehicle, the spurs 62 likewise being thrown out through centrifugal force, presenting an effect as best shown in Fig. 3, and it will be seen that as the spars 58 are in their combined length considerably wider than the widest part of the vehicle or its armored walls, that the device may be used very effectually in forcing a passage through a group of persons.

When it is not desired to make use of the spars, the same may be folded upon their hinges alongside the walls of the car, thereby offering no material obstruction to its passage.

I claim:—

1. In a vehicle of the class described, the combination with a self-propelled dirigible truck, of obliquely disposed walls slidably arranged in pairs upon each side of said truck, means for keeping said walls in their outermost position, a cover plate over said truck, a vertical shaft passing therethrough, a plurality of arms rotatable over said cover, and means for rotating said arms.

2. In a vehicle of the class described, the combination with a self-propelled dirigible truck, of a shaft transversely arranged at the front of said vehicle, a motor carried by said truck, connections between said motor and said shaft whereby the latter may be rotated, a pair of oppositely disposed bars hingedly engaged with the end of said shaft and upon opposite sides of the vehicle, and a plurality of spurs hingedly engaged with each of said bars.

3. In a vehicle of the class described, the combination with a self-propelled dirigible truck, a diamond shaped casing secured to said truck, the walls of said casing being relatively movable, a cover over said truck, a vertical shaft extending upward through said cover, means carried by said shaft for sweeping said cover, a horizontal shaft disposed between the walls of said casing at the extreme front of the vehicle, means for driving both of said shafts, bars engaged at the ends of said horizontal shaft in such manner as to fold alongside the walls of said vehicle, and a plurality of spurs loosely engaged with said bars, said spurs being normally pendent and so arranged as to be thrown radially outward due to the centrifugal effect of the rotation of said shaft.

In testimony whereof I have affixed my signature.

JAN ZAWACKI.

Copies of this patent may be obtained for five cents each, by addressing the "Commissioner of Patents, Washington, D. C."